Patented Dec. 10, 1935

2,023,993

UNITED STATES PATENT OFFICE 2,023,993

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application November 12, 1934, Serial No. 752,720

3 Claims. (Cl. 196—4)

This invention relates to the treatment of emulsions of mineral oil and water, such as petroleum emulsions, for the purpose of separating the oil from the water, our present application being a continuation in part of our co-pending application for patent Serial No. 715,770, filed March 15, 1934.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type to the action of a treating agent or demulsifying agent of a particular composition hereinafter described, thereby causing the emulsion to break down and separate into its component parts of oil and water or brine, when the emulsion is permitted to remain in a quiescent state after such treatment, or subjected to an equivalent separatory procedure.

The treating agent or demulsifying agent contemplated by our process is produced by neutralizing a mixture of fatty bodies derived by heating or dehydrating ricinoleic acid, with a weak amine base, such as triethanolamine or the like, and then mixing such neutralized fatty body with pine wood intermediate oil.

The word "saponification" is used in the chemistry of fats to indicate the conversion of fats, that is, esters, into fatty acids or their salts. The conversion of a fat into the sodium salt, i. e., soap-making, is frequently referred to as "saponification". Likewise, the neutralization of a fatty acid is referred to as "saponification". The saponification number is an analytical index, which indicates the amount of alkali required to replace the glycerol ester or acidic hydrogen, or the like.

What fats are saponified so as to yield the corresponding fatty acids, the process is sometimes referred to as acid saponification, because the reaction is commonly carried out in the presence of an acid, such as sulfuric acid, and also in the presence of a catalyst, such as a Twitchell reagent or a Petroff reagent. Often it is conducted at an elevated temperature above the boiling point of water, and sometimes under pressure. Processes intended to produce similar results may depend upon hydrolysis with steam in presence of small amounts of alkalis, or on reaction with water in the presence of enzymes. Naturally, a fat might be saponified with alkali so as to produce the sodium salt, and this salt might be dissolved in water and the fatty acid liberated by means of a dilute mineral acid, such as hydrochloric acid.

Having obtained ricinoleic acid by any one of such processes, we proceed to dehydrate the ricinoleic acid. The easiest method is to heat the ricinoleic acid at slightly above 100° C. or thereabouts, until the acid value has dropped to approximately two-thirds or less of the acid value of ricinoleic acid (188), and the acetyl value has dropped in similar proportion. The acetyl value of ricinoleic acid is 164. Under these conditions, the iodine number remains substantially normal, as indicated by value of 80 to 85. A lower temperature can be employed in presence of a non-sulfonating dehydrating agent, such as anhydrous sodium sulfate. Any equivalent method of dehydration may be employed.

The fatty material, thus obtained, is differentiated from ricinoleic acid, by virtue of a decreased acid value and decreased acetyl value. This product is obtained by dehydration, that is, principally by removal of water of esterification, and perhaps to a minor degree by removal of water formed by combination of two carboxyl radicals, that is, the formation of an anhydride. Such a product cannot be obtained by decomposition of the kind wherein castor oil is distilled until a loss of weight is incurred, such as 10% or more. When such last named products are saponified and acidified, ricinoleic acid is not regenerated, because pyrolytic decomposition has previously taken place. If the ricinoleic acid dehydration product contemplated for use as one constituent of the mixture employed in the present process for treating cut oil, is saponified and acidified, then ricinoleic acid is regenerated.

It is also true that materials somewhat similar at first casual examination, although in reality different in composition from such ricinoleic acid dehydration products, may be obtained by the sulfation of castor oil, as in the manufacture of Turkey red oil from castor oil. This is especially true if the sulfation mass is subjected to an effective hydrolytic washing process, so as to decompose the fatty acid sulfates. This is not customary in the manufacture of Turkey red oil, because one is interested in conserving the fatty acid sulfate content, not in destroying it. However, in the sulfation of castor oil or ricinoleic acid, at least partial saturation of the ethylene linkage takes place by the formation of an addition product. Subsequently, when the hydrolytic washing process takes place, the sulfuric addition product is decomposed and the ethylene linkage is then saturated by means of an added hydrogen atom and an added hydroxyl radical. Thus, the somewhat similar products obtained by sulfation and effective hydrolytic washing, as differentiated from ordinary Turkey red oil manufacture, are characterized by products having a reduced or lower iodine number, i. e., an iodine number which is sub-normal compared with the normal iodine number of castor oil or ricinoleic acid which happens to be approximately 80 to 88. Therefore, in order to differentiate the product used as one constituent of the reagent employed in the present process from the products obtained by sulfation of castor oil and followed by effective hydrolytic process, we will indicate that the products employed in the present process have a normal iodine value. Furthermore, sulfation of castor oil may result, after effective hydrolytic washing, in products having some ether type bodies present. Ether type bodies are derivatives of ricinoleic acid or the like, in which two hydroxyls combine with the loss of a molecule of water. When such products are saponified and esterified the acetyl value does not go back to normal, because the ether type bodies do not regenerate hydroxyl groups by saponification and acidified. This is analogous to the fact that ordinarily ethyl ether plus alkali does not readily produce ethyl alcohol. Therefore, the products employed as a reagent in the present process are further characterized and differentiated from other products by being free from ether type bodies.

We have found that this dehydrated ricinoleic acid, if rendered water-soluble by means of a weak amine base, which does not saponify or decompose any of the esters or ester-like bodies present, gives an excellent demulsifying agent after being diluted with or mixed with pine wood intermediate oil. We prefer to use triethanolamine to neutralize the free carboxylic hydrogen of the dehydrated ricinoleic acid, but we may employ any other suitable amine, such as triethanolamine, etc.

The distillation of fat pine wood in addition to yielding turpentine and pine oil, also yields another oil known as intermediate oil or pine wood intermediate oil. This oil should not be confused with pine oil, which is essentially a mixture of liquid alcohols, and similarly, should not be confused with turpentine, which represents certain somewhat similar hydrocarbons, but of lower molecular weight. Reference is made to "Industrial & Enginering Chemistry", vol. 26, No. 7, page 704. The following statements are taken verbatim:

"Steam-distilled pine oil contains a few percent of terpene hydrocarbons boiling above turpentine but is principally tertiary terpene alcohols, such as alpha-terpineol, and also contains the secondary terpene alcohols, fenchol and borneol, together with a small amount of phenol ether, methyl chavicol."

"The total oil recovered from the fat pine wood is not all turpentine and pine oil. Other terpene hydrocarbons, such as limonene, dipentene, terpinene, and terpinolene, are also recovered from pine wood. These terpene hydrocarbons have a boiling range between pinene, which is the principal constituent of the turpentine, and the pine oil, and may be cut out in the refining of the crude turpentine or separated during the fractionation of pine oil. These intermediate oils have become in recent years standard products of the industry as they are valuable solvents for special purposes."

After producing dehydrated ricinoleic acid in the manner previously described, and neutralizing the same with a suitable base such as triethanolamine, we have found that the effectiveness of the reagent is increased by dilution with a suitable amount, for instance, 25% to 50% by volume, of intermediate pine wood oil. Obviously, the intermediate pine wood oil may be added to the dehydrated ricinoleic acid prior to its neutralization with triethanolamine or similar materials.

So far as we are aware, intermediate pine wood oil has never been used as a solvent in connection with any demulsifying agent. However, we have not found it to be of any unusual advantage as a solvent with most demulsifying agents as compared with some other solvent available at a lower price. Pine oil has been used as a solvent admixed with demulsifying agents obtained by sulfation of reactive fatty materials, etc. We are not aware that pine oil has ever been used as a solvent in connection with the particular fatty materials of the kind contemplated as one component of the mixture used as the demulsifying agent in the present process. We have not found it satisfactory to replace pine wood intermediate oil in the composition of the reagent contemplated for use in the present process, with either turpentine or pine oil. We have no explanation to offer as to why the addition of pine wood intermediate oil as a component of our present mixture appears to yield a much more effective reagent on many emulsions than when some other solvent is employed.

The value of the process herein described appears to depend largely upon the peculiar combination of constituents as they occur in the reagents described. By using the specified reagents to break emulsions, it is possible to obtain results which are not obtainable by use of the various individual constituents composing the reagent employed in the present process.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above refered to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of one part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent comprising dehydration products of ricinoleic acid characterized by (a) a normal iodine number; (b) an acid number approximating two-thirds or less of that of ricinoleic acid; (c) an acetyl number approximating two-thirds or less of ricinoleic acid; (d) substantial absence of ether-type anhydrides; and (e) capable of regenerating the ricinoleic acid by saponification and acidification, said dehydration products being neutralized with a substituted basic amine and diluted with pine wood intermediate oil.

2. A process for breaking petroleum emulsions of the water-in-oil type, which consists in subjecting the emulsion to the action of a demulsifying agent comprising dehydration products of ricinoleic acid characterized by (a) a normal iodine number; (b) an acid number approximating two-thirds or less of that of ricinoleic acid; (c) an acetyl number approximately two-thirds or less of ricinoleic acid (d) substantial absence of ether-type anhydrides; and (e) capable of regenerating the ricinoleic acid by saponification and acidification, said dehydration products being neutralized with triethanolamine and diluted with pine wood intermediate oil.

3. A process for breaking petroleum emulsions of the water-in-oil type, which consists in subjecting the emulsion to the action of a demulsifying agent comprising dehydration products of ricinoleic acid characterized by (a) a normal iodine number; (b) an acid number approximating two-thirds or less of that of ricinoleic acid; (c) an acetyl number aproximately two-thirds or less of ricinoleic acid; (d) substantial absence of ether-type anhydrides; and (e) capable of regenerating the ricinoleic acid by saponification and acidification, said dehydration products being neutralized with triethanolamine and diluted with approximately 50%, by volume, of pine wood intermediate oil.

MELVIN DE GROOTE.
BERNHARD KEISER.